(12) United States Patent
Stenquist

(10) Patent No.: US 6,491,143 B1
(45) Date of Patent: Dec. 10, 2002

(54) LOW IMPACT GAS SPRING

(75) Inventor: Sven Stenquist, Bodators (SE)

(73) Assignee: Diebolt International, Inc., Plymouth, MI (US)

( * ) Notice: Subject to any disclaimer, the term of this patent is extended or adjusted under 35 U.S.C. 154(b) by 0 days.

(21) Appl. No.: 09/645,683

(22) Filed: Aug. 24, 2000

Related U.S. Application Data (63) Continuation-in-part of application No. 09/475,582, filed on Dec. 30, 1999, now abandoned.

(51) Int. Cl.[7] .................................................. F16F 9/06
(52) U.S. Cl. .............. 188/269; 188/322.15; 267/64.11; 267/64.15; 267/119
(58) Field of Search .......................... 267/64.11, 64.15, 267/64.22, 75, 118, 119, 124, 126, 127, 113; 188/269, 322.15, 322.21; 277/474

(56) References Cited

U.S. PATENT DOCUMENTS

| | | | |
|---|---|---|---|
| 3,786,724 A | 1/1974 | Martin | 91/395 |
| 4,166,612 A | 9/1979 | Freitag et al. | 265/65 |
| 4,650,165 A | 3/1987 | Siemann | 267/64 |
| 5,152,547 A | * 10/1992 | Davis | 280/707 |
| 5,588,641 A | * 12/1996 | Sand | 267/119 |
| 5,823,513 A | 10/1998 | Stenquist | 267/64.26 |

FOREIGN PATENT DOCUMENTS

| | | |
|---|---|---|
| DE | 2445240 | 4/1976 |
| DE | 2713815 | 10/1978 |
| DE | 4004714 | 8/1991 |
| EP | 0753684 | 1/1997 |
| GB | 1016986 | 1/1966 |
| GB | 2303194 | 2/1997 |

* cited by examiner

Primary Examiner—Christopher P. Schwartz
Assistant Examiner—C. T. Bartz
(74) Attorney, Agent, or Firm—Reising, Ethington, Barnes, Kisselle, Learman & McCulloch, P.C.

(57) ABSTRACT

A spring having a main gas chamber, a secondary gas chamber and sealing surfaces which, during a portion of the stroke of the piston rod, define a gas tight seal between them to provide two separate gas chambers each providing a force acting on the piston rod in opposed directions to each other to reduce the net force on the piston rod. When the piston rod is near its fully extended position the sealing surfaces provide the gas tight seal and the net force on the piston rod is minimal and in the direction to move the piston rod to its fully extended position. Thus, until the cooperating surfaces are displaced to terminate the gas tight seal, only a slight force is required to initially move the piston rod from its fully extended position. This greatly reduces the impulse or impact force imparted to a press ram upon initial actuation of the fully extended piston rod. A second seal assembly may also be provided which controls the rate at which the piston rod assembly returns to its fully extended position. After the gas tight seal is terminated, the gas spring functions generally as a conventional gas spring with a single gas pressure acting on the piston rod and biasing the piston rod towards its extended position against the force of the ram displacing it.

32 Claims, 8 Drawing Sheets

LOW IMPACT GAS SPRING

REFERENCE TO CO-PENDING U.S. PATENT APPLICATION

This application is a continuation-in-part of co-pending U.S. patent application Ser. No. 09/475,582 which was filed on Dec. 30, 1999 and subsequently abandoned in favor of this continuation-in-part patent application.

FIELD OF THE INVENTION

This invention relates generally to gas springs and more particularly to a as spring constructed to reduce the net force across a piston rod assembly of the spring during at least a portion of the stroke of the piston rod assembly.

BACKGROUND OF THE INVENTION

Gas springs are well known and have been used in dies of presses for sheet metal stamping operations. Conventional gas springs have a gas chamber which receives a pressurized gas that provides a force on a piston and piston rod of the gas spring to bias them to an extended position and to resist the movement of the piston and piston rod from their extended position to a retracted position. Various retainers and seals are provided in the gas spring to retain the piston and piston rod within a casing of the gas spring and to prevent leakage of the pressurized gas from the gas chamber.

Typically a plurality of gas springs yieldably urge a binder ring or clamp ring of the die assembly into engagement with a sheet metal workpiece as the dies are closed by the press to cold form the workpiece. Typically the press has a mechanical drive mechanism with a toggle linkage or a crank and meshed gears to advance and retract a press ram relative to a bed to open and close the dies. In presses with mechanical drive mechanisms the mechanical advantage of the mechanism varies depending on the position of the ram and increases dramatically as the ram approaches the fully advanced or extended position to completely close the dies and form the workpiece. As the ram advances from its middle stroke position, its mechanical advantage and the maximum instantaneous force produced by the press are relatively low.

When the ram of the press is in its middle stroke position, the piston and rod of the gas spring are typically in their fully extended position and they are initially moved toward their retracted position well before the ram reaches its fully extended position. Consequently, the gas springs initially apply a relatively large force or load to the drive mechanism of the press relative to the maximum force the press is capable of producing during its initial movement of the ram from its fully retracted position toward its advanced position closing the dies. Moreover, since the mechanical drive mechanism of the press has already begun moving and accelerating the ram and the die half attached thereto before it begins to actuate and overcome the resistance produced by the gas springs, the initial impact or actuation of the gas springs creates an impulse force spike of high magnitude and short duration on the drive mechanism of the press which over time can significantly shorten the useful life of the press, significantly increase the press maintenance and repair cost, and in some instances even rapidly seriously damage the drive mechanism of the press.

Similarly, during opening of the closed dies after a workpiece has been formed, the gas springs apply significant force to the drive mechanism of the press which is suddenly terminated when their piston rods become fully extended which produces a sudden change in the load on the drive mechanism. This rapid force change can also damage the press and vibration or bouncing of the binder ring is caused at this same time by the inertia of the die component. This gas spring will reduce the magnitude of the bounce after a part is made.

SUMMARY OF THE INVENTION

A gas spring having a pair of sealing surfaces which, during a portion of the stroke of a piston rod assembly of the gas spring, define a gas tight seal between them to define a secondary gas chamber separate from a main gas chamber of the gas spring. Each gas chamber contains a gas under pressure and provides a force acting on the piston rod assembly in generally opposed directions to reduce the net force on the piston rod assembly. Desirably, when the piston rod assembly is near its fully extended position the sealing surfaces provide the gas tight seal and the differential force across the piston produces only a small net force in the direction tending to move the piston rod assembly to its extended position. Thus, a greatly reduced force is required to initially move the piston rod assembly from its extended position toward its retracted position. This greatly reduces the initial resistance to movement of the gas spring and hence the impulse or impact force imparted to a press ram upon initial actuation of the piston rod of the gas spring. After the gas tight seal is terminated, the gas spring functions generally as a conventional gas spring with a single gas chamber providing a pressurized gas acting on the piston and biasing the piston rod assembly towards its extended position against the force of the press ram displacing it.

Desirably, during the return stroke and after the seal is initially formed between the sealing surfaces, the gas in the secondary gas chamber is compressed by further movement of the piston rod assembly toward its extended position producing a higher pressure of gas in the secondary gas chamber compared to the main gas chamber. The gas in the secondary gas chamber acts on a considerably smaller surface area than the gas in the main gas chamber and therefore, this higher-pressure gas in the secondary gas chamber provides an increased force to reduce the net force on the piston rod assembly.

In one embodiment, a first sealing surface is preferably formed in a retainer which has a stop surface to maintain the piston rod assembly within a casing of the gas spring. The second sealing surface is defined by a sleeve carried by the piston rod assembly, and may be defined by an annular sealing member, such as an O-ring, carried by the sleeve to provide the gas tight seal between the sealing surfaces. In another embodiment, the first sealing surface is defined by the interior surface of the casing of the gas spring. As still another alternative, the second sealing surface may be defined integrally with the piston and/or the piston rod. In whatever form, the sealing surfaces provide a gas tight seal, to define the secondary gas chamber separate from the main gas chamber, which is initiated at a point in the piston rod assembly stroke between its extended and retracted positions and continues to the extended position of the assembly. Desirably, the secondary gas chamber is relatively small in comparison to the first gas chamber to reduce the volume of gas which is compressed after the gas tight seal is initiated to limit the increase in temperature of the gas spring.

In another embodiment, a second pair of sealing surfaces are provided to define, when the sealing surfaces are engaged with each other, separate gas chambers to reduce the speed of the piston rod assembly as it moves adjacent to and towards its fully extended position. This slower movement of the piston rod assembly provides a smoother or more subtle transition from movement of the piston rod assembly toward its extended position to a stopped or static state of the piston rod assembly in its fully extended position. This reduces or eliminates the bounce of a binder or clamp ring and the formed workpiece on the binder ring after the press ram is removed from or releases from the binder ring on the piston rod in the return stroke of the piston rod assembly. Additionally, this greatly reduces the noise caused by the bouncing binder ring and workpiece and the metal to metal contact within the gas spring which limits movement of the piston rod assembly and defines the fully extended position of the piston rod assembly. Further, this reduces or eliminates misalignment of the formed workpiece relative to the binder ring, which was previously caused by the bouncing of the binder ring and workpiece, to facilitate subsequent handling of the formed workpiece.

Objects, features and advantages of this invention include providing a gas spring which requires a reduced force to initially displace a piston rod assembly from its extended position, reduces the velocity of the piston rod assembly at least when it is adjacent to and moving towards its extended position, reduces the impulse or impact force on a press when it initially engages the gas spring, reduces damage to the press and gas spring, extends the useful life of a press and gas spring, reduces noise of the press in use, reduces noise of the gas spring in use, reduces vibration and misalignment of work pieces formed by the press, reduces or eliminates bounce of a binder ring and workpiece after the return stroke of the piston rod assembly, maintains a relatively low gas spring operating temperature, is easy to service and repair, is durable, reliable, of relatively simple design and economical manufacture and assembly and has a long and useful in service life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figures 1, 2, 4, 5:
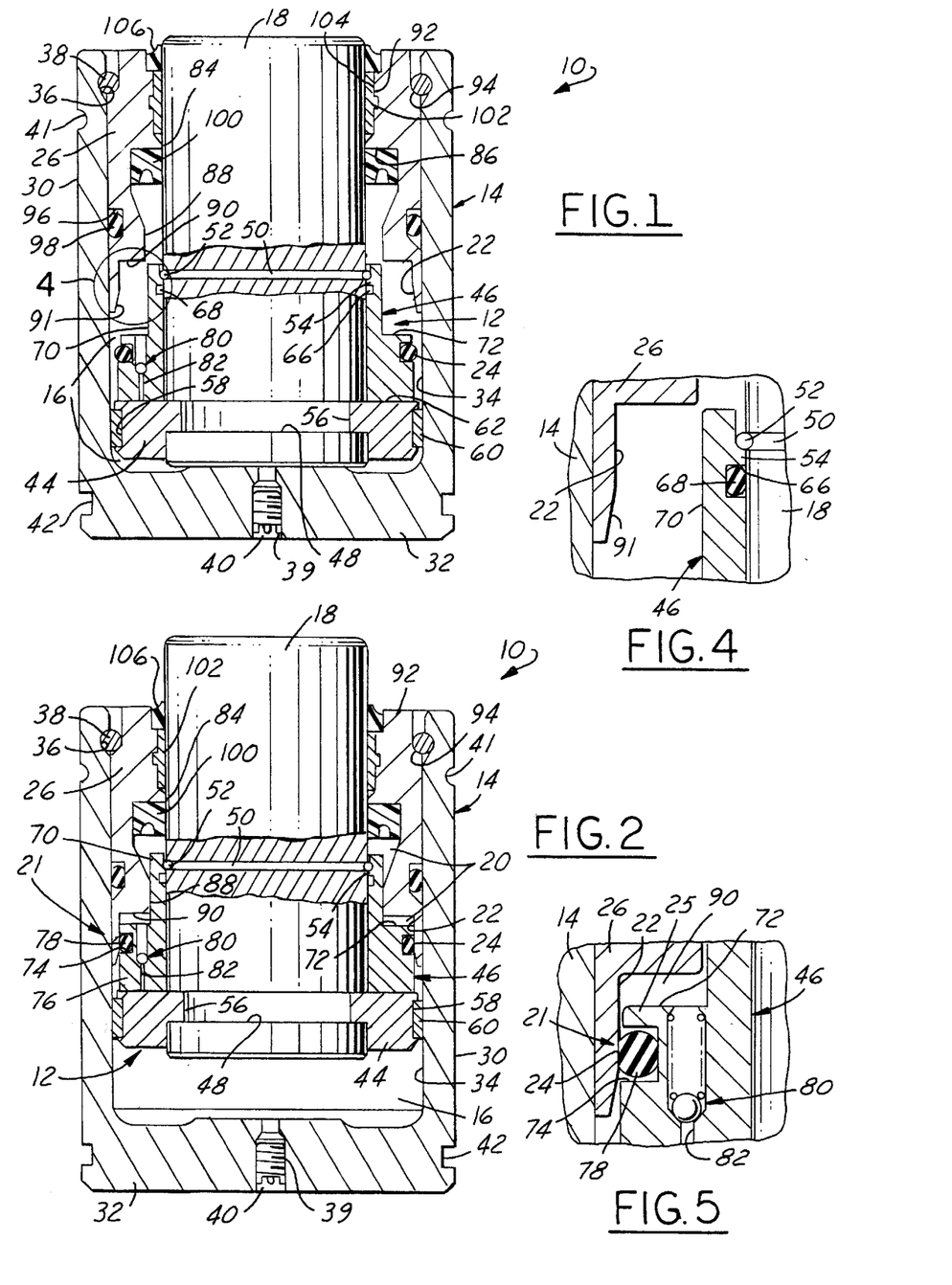
FIG. 1 is a cross sectional view of a gas spring according to the present invention and showing a piston rod assembly in its retracted position.
FIG. 2 is a cross sectional view of the gas spring showing the piston rod assembly in an intermediate position.
FIG. 4 is an enlarged fragmentary sectional view of the encircled portion 4 of FIG. 1.
FIG. 5 is an enlarged fragmentary sectional view illustrating the engagement of the sealing surfaces.
Figure 3:
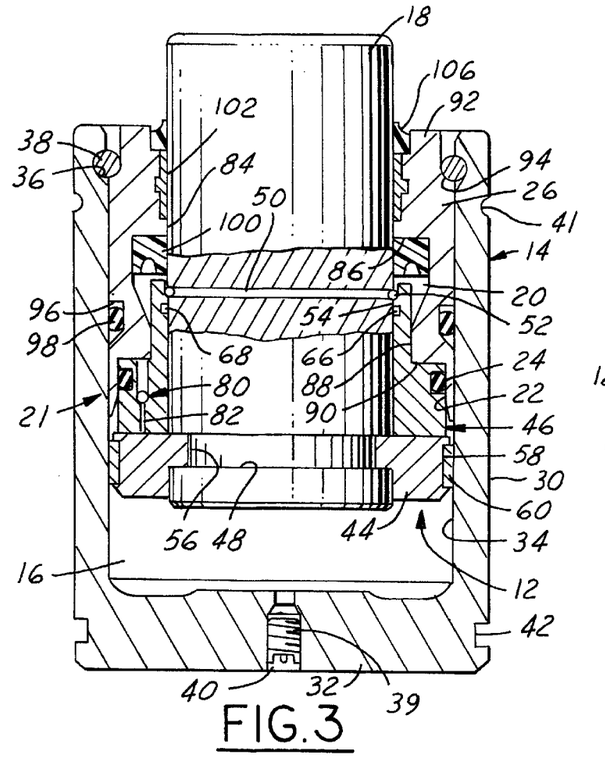
FIG. 3 is a cross sectional view of the gas spring showing the piston rod assembly in its extended position.

Referring in more detail to the drawings, FIGS. 1–3 illustrate a gas spring 10 embodying this invention and having a piston rod assembly 12 received within a generally cylindrical casing 14 for reciprocation between extended and retracted positions. A main gas chamber 16 is defined in part between the casing 14 and the piston rod assembly 12 and receives a pressurized gas acting on the piston rod assembly 12 to yieldably bias it toward its extended position. Both the force required to initially retract the piston rod 18 and the force produced by the returning piston rod immediately adjacent the end of its return stroke are significantly reduced by compression of gas in a secondary gas chamber 20 (FIGS. 2 and 3) intermittently and cyclically sealed from the main gas chamber 16 by a telescoping seal assembly 21.

A plurality of gas springs 10 may be disposed in a mechanical press such that a piston rod 18 of each gas spring is actuated by a ram of the press as it is advanced to yieldingly urge a clamp ring or binder ring of a die assembly into engagement with a sheet metal blank or other workpiece to be stamped or formed by the die assembly and press. The press may be an eccentric, crank or toggle-type mechanical press, for example. Desirably, the force applied to the press ram upon initial retracting actuation of the piston rod 18, and also when the press ram is disengaging from the piston rod 18 on the return stroke, is reduced by the compression of gas in the secondary gas chamber 20 (FIGS. 2 and 3) in the spring 10 which provides a force in opposition to the biasing force of the gas in the main gas chamber 16. Desirably, during at least a portion of the stroke of the piston rod assembly 12 the secondary gas chamber 20 is sealed from the main gas chamber 16 by the seal assembly 21.

The casing 14 is an open ended tubular member with a circumferentially continuous sidewall 30 and a base 32 preferably integrally formed with the sidewall 30 and closing one end of the casing 14. An interior surface 34 of the casing 14 has an annular groove 36 providing a shoulder or stop surface for a wire ring retainer 38. To admit gas into the main gas chamber 16, a filler valve 39 is received in a passage 40 in the base 32 or elsewhere in the casing 14. To facilitate mounting and locating the gas spring 10, spaced apart circumferential grooves 41, 42 are formed in the exterior of the gas spring 10.

The piston rod assembly 12 comprises an elongate, generally cylindrical piston rod 18, a split retainer ring 44 received in a groove 48 in the piston rod 18, and an annular sleeve 46 rearing on the ring 44 and carried by the piston rod 18 for co-movement therewith. As shown in FIG. 4, the sleeve 46 is retained on the rod by a split ring 52 received in a groove in the piston rod 18 and bearing on a shoulder 54 of a recess in the sleeve 46. The piston rod 18 extends out of the open end of the casing 14 and preferably even in its fully retracted position, as shown in FIG. 1, extends slightly above or beyond the open end of the casing 14 to prevent the press ram or clamp ring from engaging the casing.

The retainer ring 44 is an annular split ring having a radially inwardly extending shoulder 56 constructed to be closely received within the groove 48 of the piston rod 18 to retain the ring 44 on the piston rod 18. A circumferential groove 58 about the exterior of the ring 44 preferably receives an annular guide rearing 60 which slidably engages the interior surface 34 of the casing 14 to guide the piston rod assembly 12 for axial reciprocation within the casing 14. The ring 44 preferably has a generally flat face 62 on which the sleeve 46 is received.

Figure 12:
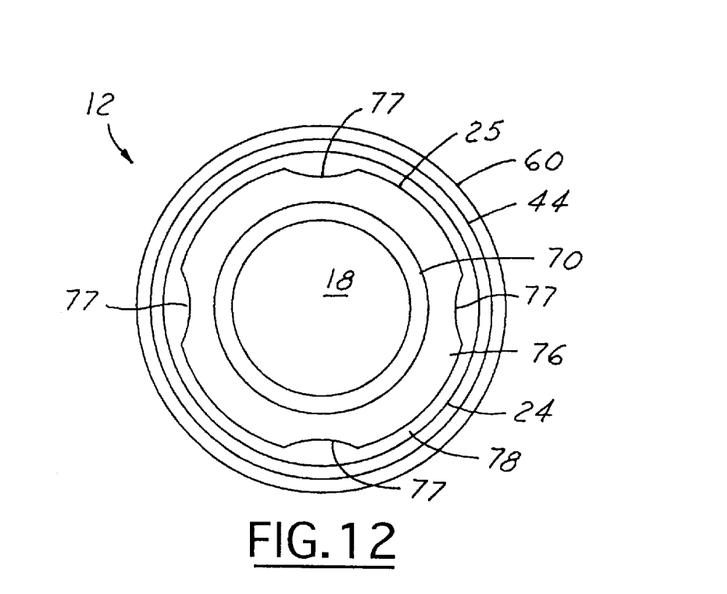
FIG. 12 is a plan view of the piston rod assembly of FIG. 1.

The sleeve 46 is preferably generally annular with a generally cylindrical sidewall having a groove 66 formed in its inner surface constructed to receive a sealing member 68, such as an O-ring, to provide a gas-tight seal between the sleeve 46 and the piston rod 18. A reduced diameter end 70 of the sleeve 46 defines a radially outwardly extending shoulder 72 adapted to engage the retainer 26 to limit the movement of the piston rod assembly 12. A circumferential groove 74 formed in an enlarged diameter base 76 of the sleeve 46 receives a sealing member 78 such as an O-ring. As best shown in FIG. 12, flange 25 has notches 77 in at least one and preferably multiple places to prevent back sealing of the O-ring 78 on the return stroke of the gas spring. The O-ring 78 preferably extends radially outwardly from the exterior of the base 76 and defines a second sealing surface 24 constructed to be telescoped into and engage the first sealing surface 22 to provide a gas-tight seal between them. A check valve 80 selectively permits gas flow through a passage 82 in the sleeve 46 to permit pressurized gas to enter the secondary gas chamber 20 when the main gas chamber 16 is initially filled with pressurized gas and the piston rod assembly 12 moves to its extended position providing the gas tight seal between the sealing surfaces 22, 24. Permitting pressurized gas to flow into the secondary gas chamber 20 prevents a gas pressure from being developed in the secondary gas chamber 20 during the initial stroke of the piston rod assembly 12, which is less than the gas pressure in the main chamber 16. If the pressurized gas is added to the gas spring when the piston rod assembly 12 is in its retracted position, the check valve 80 is not required as the sealing surfaces 22, 24 are not engaged and the gas may flow throughout the main and secondary gas chambers 16, 20.

The retainer 26 has a bore 84 through which the piston rod 18 is received, a first counterbore 86 which defines in part the secondary gas chamber 20 when the sealing surfaces 22, 24 provide the gas-tight seal, a second counterbore 88 providing clearance to receive the end 70 of the sleeve 46, and a third counterbore 90 defining the circumferential first sealing surface 22 engageable with the second sealing surface 24 of the sleeve 46. A smooth and controlled compression and entry of the seal 24 into the cylindrical sealing surface 22 and exit therefrom is provided by an adjacent radially outwardly tapered or flared surface 91. A reduced diameter end 92 formed at one end of the retainer 26 provides an annular generally radially outwardly extending shoulder 94 adapted to engage the split retaining ring 38 received within the groove 36 of the casing 14 to hold the retainer 26 within the casing 14. A second circumferential groove 96 in the exterior of the retainer receives a sealing member such as an O-ring 98 to provide a gas-tight seal between the retainer 26 and the casing 14.

Desirably, an annular, circumferentially continuous seal 100 is received within the first counterbore 86 of the retainer 26 and has an inner diameter slightly less than the outer diameter of the piston rod 18 to provide a gas-tight seal between them. A bearing 102 is received in another counterbore 104 of the retainer 26, axially outward of the sealing member 100, to slidably engage and guide the piston rod 18 as it reciprocates. An annular, circumferentially continuous wiper 106 is received in a recess outward of the bearing 102 to remove contaminants from the piston rod 18 and thereby prevent the gas springs 10 from becoming contaminated or fouled.

In use, typically one or usually a plurality of gas springs 10 are received in a die assembly with a workpiece clamp ring or binder ring resting on the ends of the extended rods 18 of the gas springs. The die assembly is received in a press with one die attached to the bed and the other die attached to the ram of the press. The press may have a toggle, eccentric, crank and meshed gears or other mechanical mechanism driving the ram. As the ram is advanced from its fully retracted position, the clamp ring is urged by the gas springs into engagement with a metal blank to be formed and then the rods of the gas springs are retracted as the dies are moved toward their fully closed position to form or stamp the blank and form a part as the ram is moved to its fully extended position.

This movement of the press ram to its fully extended position during its forming stroke displaces the piston rod assembly 12 towards the base 32 of the casing 14 against the force of the pressurized gas in the main gas chamber 16 which acts on the piston rod assembly 12. Desirably, the press ram will reach its fully extended position before the piston rod assembly 12 bottoms out on the casing 14 to prevent damage to the gas spring 10. With the piston rod assembly 12 in its fully retracted position, as shown in FIG. 1, the main and secondary chambers 16 and 20 communicate with each other and all of the gas contained within the gas spring 10 is at the same pressure, there is effectively only one gas chamber, and the gas is able to flow around the sleeve 46 and between the sleeve 46 and the retainer 26.

Figure 11:
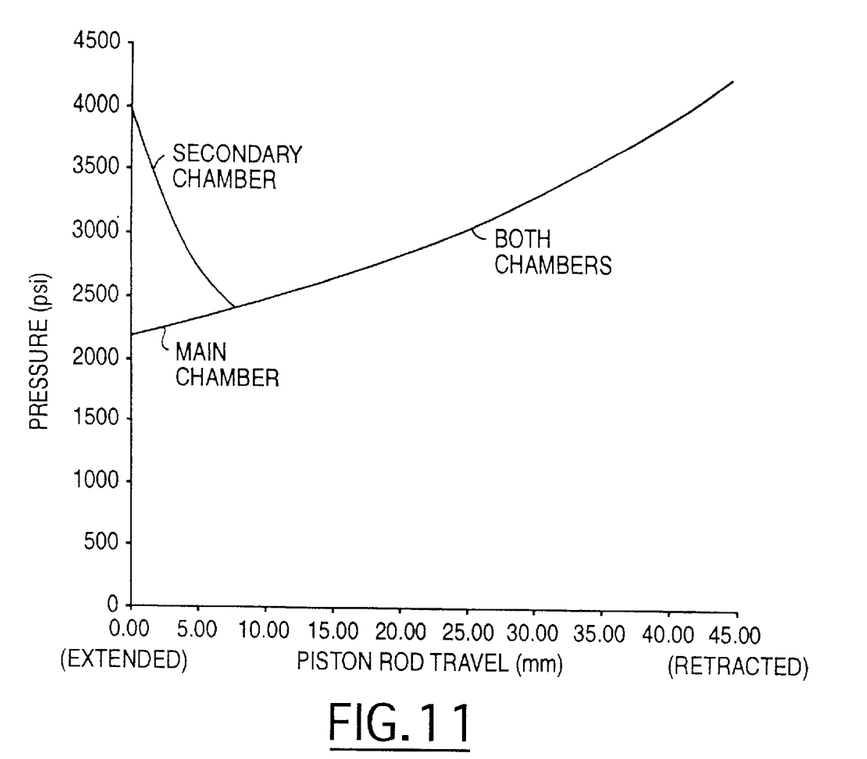
FIG. 11 is a graph of Pressure as a function of Travel of the piston rod assembly illustrating the pressure in the gas chambers of the gas spring.

As the press ram begins its return stroke, the piston rod assembly 12 moves towards its extended position due to the force of the gas acting on the piston rod assembly 12. Initially, as shown in FIG. 11 when the piston rod assembly 12 is in its retracted position and until the seal is formed, the main and secondary chambers 16 and 20 communicate with each other and therefore, one gas pressure exists in the gas spring 10. At a point in the return stroke of the piston rod assembly 12, as the piston rod assembly 12 moves from its retracted position towards its fully extended position, the O-ring 78 carried by the sleeve 46, (which defines the second sealing surface 24) is telescoped into and slidably engages and seals with the second sealing surface 22 of the retainer 26 to provide a gas-tight seal between them. The gas-tight seal closes the secondary gas chamber 20 from the main gas chamber 16. Initially, the gas in each chamber 16, 20 is at the same pressure so there is no pressure differential across the seal 78. The gas trapped in the secondary gas chamber 20 is compressed as the piston rod assembly 12 moves and advances further towards its fully extended position to thereby increase the pressure of the gas in the secondary gas chamber 20.

The gas in the secondary gas chamber 20 acts on a significantly smaller surface area of the piston rod assembly 12 than its surface area on which the gas in the main chamber 16 acts. Therefore, a significantly greater pressure of gas is needed in the secondary gas chamber 20 to balance the opposed forces acting on the piston rod assembly 12. The gas spring 10 is constructed such that when the piston rod assembly 12 is in its extended position, such that the secondary gas chamber 20 has its minimum volume, the pressure of gas in the secondary gas chamber 20 is greater than the pressure of gas in the main gas chamber 16. Desirably, the pressure of gas in the secondary chamber 20 is sufficiently greater than the pressure of the gas in the main chamber 16 so that the force on the piston rod assembly 12 produced by the gas in the sealed secondary chamber 20 is only slightly less than the opposing force on the piston rod assembly produced by the gas in the main chamber 16. The resulting relatively small net force biases the piston rod assembly 12 to its fully extended position so that the sleeve 46 engages the retainer 26 to accurately and consistently locate the fully extended position the piston rod 18.

When the piston rod assembly 12 is in its fully extended position this relatively small net force, produced by the compressed gas in the sealed secondary chamber 20, permits the press ram, when initially advancing from its fully retracted position, to initially move the piston rod from its fully extended position toward its retracted position with a relatively small force thereby greatly reducing the maximum initial input or load on the ram produced by the gas springs.

Figure 9:
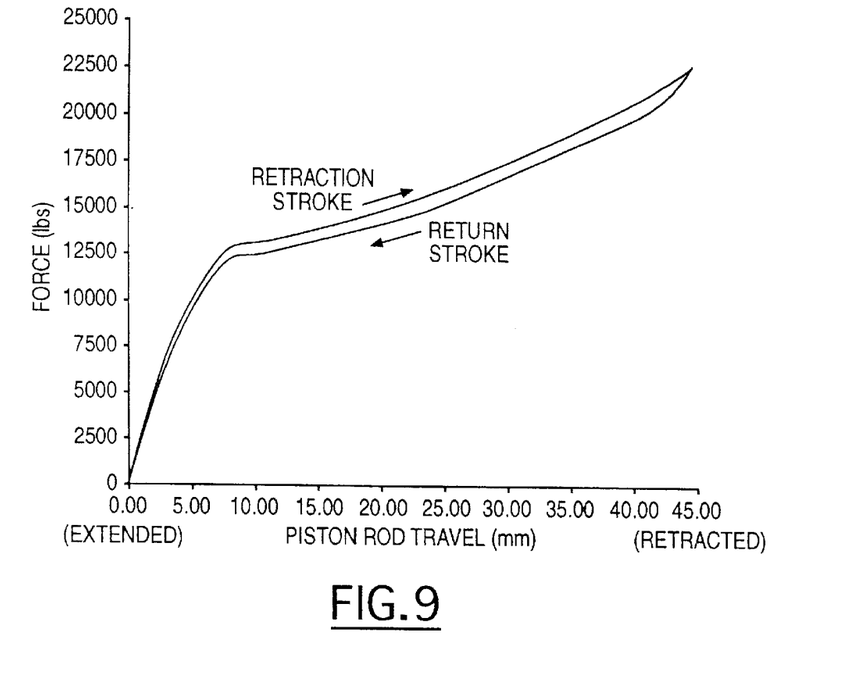
FIG. 9 is a graph of Force as a function of Travel of the piston rod assembly.
Figure 10:
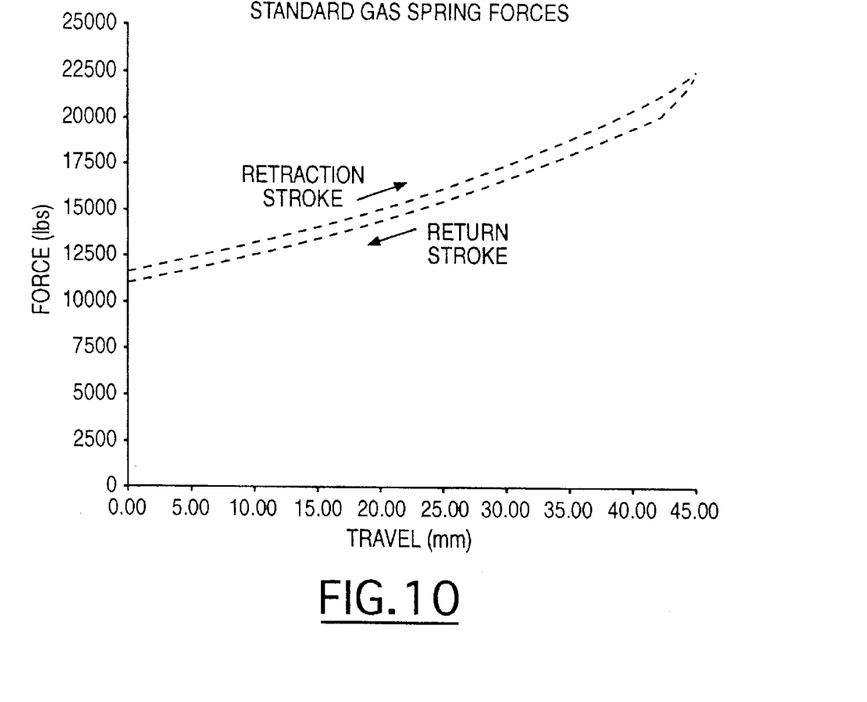
FIG. 10 is a graph of Force as a function of Travel of the piston rod assembly of a prior art gas spring.

FIG. 9 illustrates the net force as a function of displacement or travel of the piston rod assembly 12 of a practical embodiment of a gas spring 10. A comparison with FIG. 10 of the net force as a function of travel of the piston rod of a conventional prior art gas spring producing the same maximum force illustrates the dramatic difference in the net force curve and characteristics during the first and last 5 mm of travel of the piston rod of its retraction and return strokes.

FIG. 11 illustrates the pressure of the gas in the secondary chamber 20 and main chamber 16 of the practical embodiment of the gas spring 10 of FIG. 9 as a function of the extent of travel or displacement of the piston rod assembly from its fully extended position. The maximum pressure of the compressed gas in the sealed secondary chamber 20 is approximately 4100 psi when the piston rod assembly 12 is in its fully extended position and the pressure of gas in the main gas chamber 16 is approximately 2200 psi. Notably, when the seal between surfaces 22, 24 is initiated and also immediately prior to when it is terminated, the pressure of gas in the separate gas chambers 16, 20 is the same so that there is no differential force across the seal 78. This reduces wear and extends the life of the gas spring.

Desirably, a relatively small volume of gas is trapped and compressed in the sealed secondary gas chamber 20 to limit the heat generated in the gas spring 10. In any event, the subsequent stroke of the piston rod assembly 12 toward its retracted position increases the volume of the secondary gas chamber 20 and thereby cools the gas which was trapped in the secondary gas chamber 20. Therefore, the gas spring 10 of this invention does not generate significantly more heat in use than conventional gas springs. Limiting the maximum heat of the gas spring 10 is necessary to avoid the degradation of the seals of the gas spring 10.

As shown in FIG. 9, the reduced net force on the piston rod assembly 12 when it is in its extended position requires a press to produce a corresponding minimal force to initially displace the piston rod assembly 12 from its extended position toward its retracted position. A comparison of FIGS. 9 and 10 also shows the net force increases more gradually over a much greater rod stroke or period of time than in prior art gas springs. This greatly reduces or eliminates the large impact or impulse force on the press during initial engagement with and release or disengagement from the piston rod 18 to eliminate the damage to the press and the gas spring 10 from this impact or impulse force. Further, it is believed that the reduced force applied to the press as the press disengages from the piston rod 18 on the press return stroke reduces the vibration or rattling of a formed workpiece on the die by reducing the vibration or rattling of a draw ring or binder ring between the workpiece and the piston rod 18. During the movement of the piston rod assembly 12 from its extended position toward its retracted position, and after the seal between the sealing surfaces 22, 24 is terminated such that a single gas pressure exists in the gas spring 10, the gas spring 10 functions substantially as a conventional gas spring 10 for the remainder of this stroke and the return stroke until the seal is once again initiated between the sealing surfaces 22 and 24.

Figure 6:
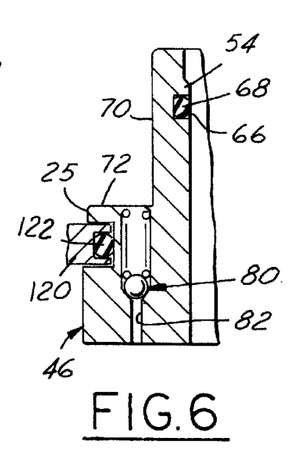
FIG. 6 is an enlarged fragmentary section view of an alternate first sealing surface.
Figure 7:
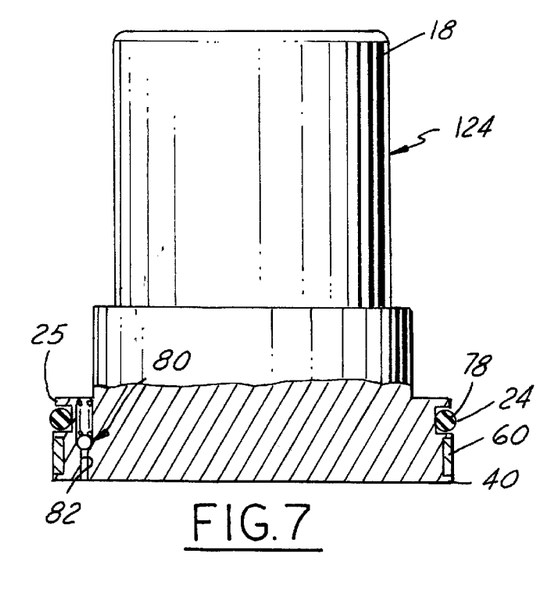
FIG. 7 is a side view of an alternate piston rod according to the present invention.
Figure 8:
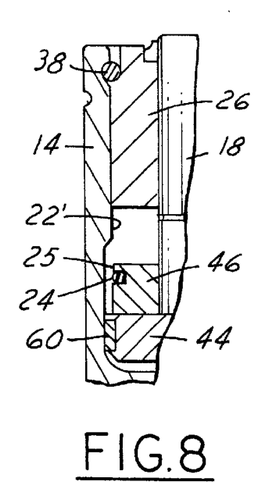
FIG. 8 is a fragmentary sectional view of an alternate embodiment of a gas spring of the invention.

An alternate sealing assembly construction 21' is shown in FIG. 6 which has an outer sliding seal 120 and an inner biasing ring such as an O-ring 122 received in the groove 74 of the sleeve 46. The seal 120 may be of a suitable urethane material and when sealing, the O-ring is compressed to urge the seal 120 radially outward into firm sealing engagement with the surface 22. As an alternative, as shown in FIG. 7, the piston rod 18, sleeve 46 and retainer ring 44 are all integrally formed as a single unit 124. As another alternative, as shown in FIG. 8, a first sealing surface 22 may be formed in the casing 14 as opposed to being a portion of the retainer 26 as in the preferred embodiment gas spring 10. It will be appreciated that still other alternatives and embodiments of this invention will be readily apparent to those skilled in the art and which do not depart from the spirit and scope of this invention as defined by the claims which follow. For example, one or more valves may be used to close the secondary gas chamber 20 during a portion of the gas spring stroke with a valve seat defining one sealing surface and a valve head defining the other sealing surface.

Second Embodiment

FIGS. 13–19 illustrate a second embodiment of a gas spring 200 according to the present invention which has a modified annular sleeve 202 but is otherwise substantially identical to the first embodiment of the gas spring 10 with like parts given like reference numbers. The sleeve 202 has an annular groove 204 in which an O-ring 206 of a second telescoping seal assembly 208 is received. One or more orifices 210 permit a controlled flow of gas therethrough to reduce the pressure differential across the O-ring 206 in a controlled manner, as desired. One or more flow passages 212 are also formed through a radially outwardly extending portion 213 of the sleeve 202 in which the O-ring 206 is received and gas flow is selectively permitted through these passages 212.

Figure 14:
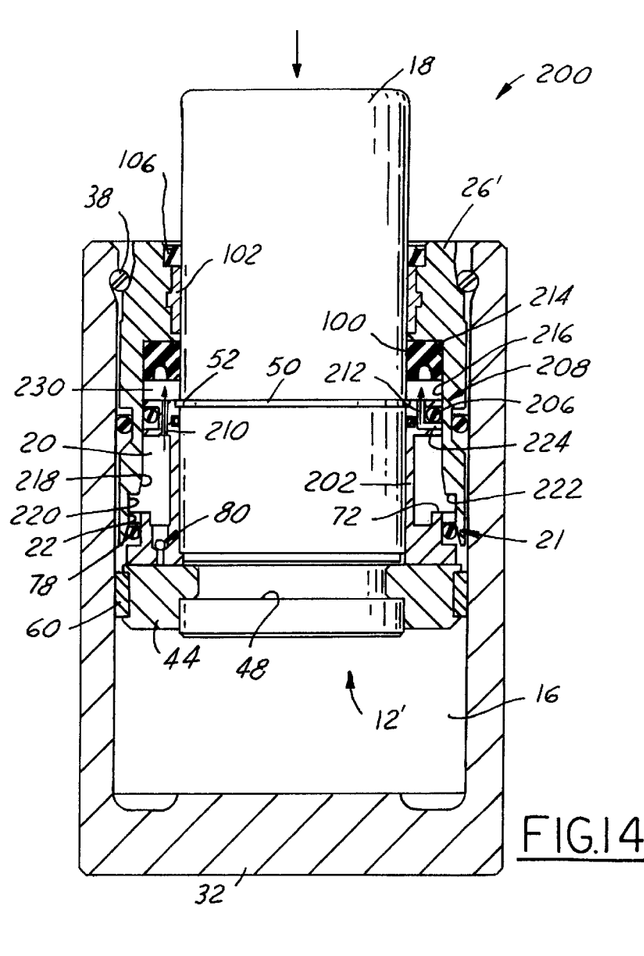
FIG. 14 is a cross sectional view of the gas spring of FIG. 13 illustrating the piston rod assembly adjacent to and moving away from its extended position.
Figures 17, 18, 19:
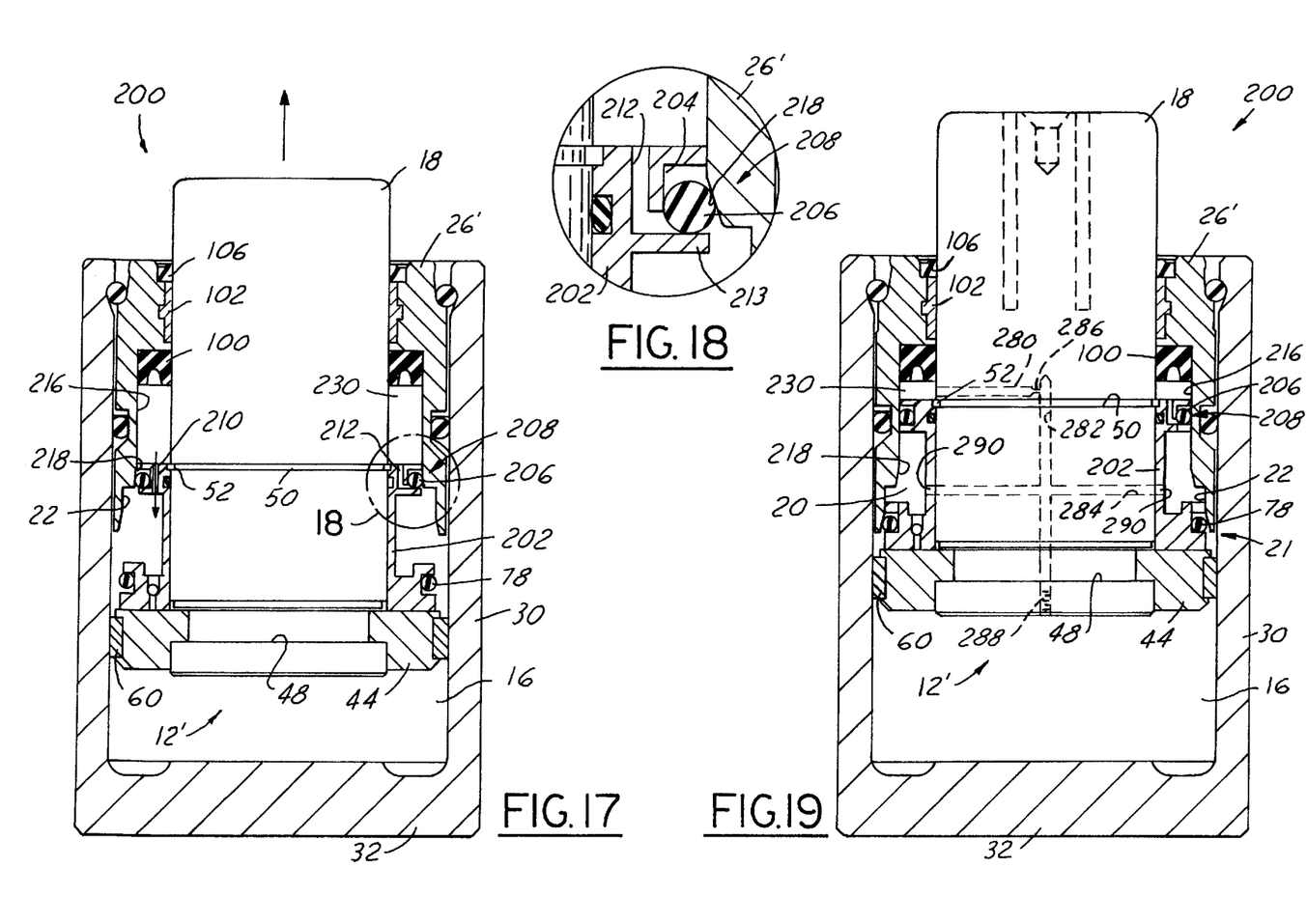
FIG. 17 is a cross sectional view of the gas spring illustrating the piston rod assembly during a portion of its return stroke moving back towards its extended position.
FIG. 18 is an enlarged fragmentary sectional view of the encircled portion 18 in FIG. 17.
FIG. 19 is a cross sectional view of the gas spring illustrating the piston rod assembly moved further toward its extended position during the return stroke and utilizing a presently preferred embodiment of the piston rod assembly.

As shown in FIG. 14, as the piston rod assembly 12' is moved from its extended position toward its retracted position, the O-ring 206 is spaced from an inlet 224 of each of the flow passages 212 to permit a relatively free flow of gas through the passages 212 and across the seal assembly 208 to reduce or eliminate any pressure differential across the seal assembly 208 during this stroke of the piston rod assembly 12'. However, as shown in FIG. 17, at least during a portion of the return stroke of the piston rod assembly 12' as it moves back toward its extended position, the O-ring 206 is displaced within its groove 204 and blocks off and seals the inlet 224 of the flow passages 212 to prevent the flow of gas across the seal assembly 208 to permit a pressure differential to build up across the seal assembly 208 as desired to control the rate of movement of the piston rod assembly 12' to its fully extended position. Thus, the O-ring 206 acts as both a seal and a valve controlling gas flow between the gas chambers. Alternatively, the O-ring 206 may only provide a seal between the retainer 26' and the casing sidewall 30 while a separately provided check valve disposed in the flow passages 212, which can be of substantially any construction including a biased ball arrangement, controls the flow therethrough in a similar manner.

The retainer 26' is also preferably modified and has a first counterbore 214 in which the annular seal 100 is received to prevent gas leakage out of the gas spring 200 and which defines a cylindrical sealing surface 216 engaged by the O-ring 206 during a portion of the movement of the piston rod assembly 12'. A radially tapered ramp portion 218 provides a smooth and controlled compression and entry of the O-ring 206 into the cylindrical sealing surface 216 and exit therefrom, as best shown in FIGS. 17 and 18. A second counterbore 220 defines a shoulder 222 engaged by a corresponding shoulder 72 of the sleeve 202 to limit the movement of the piston rod assembly 12' and to define the fully extended position of the piston rod assembly 12'.

In gas spring 200, the second telescoping seal assembly 208 is spaced from the first telescoping seal assembly 21 to define pressurized gas chambers on either side of the second seal assembly 208 and thereby control the movement of the piston rod assembly 12' at least as it is adjacent to and returning to its extended position. The second seal assembly 208 comprises the O-ring 206 received in the groove 204 formed in the annular sleeve 202 and the sealing surface 216 of the retainer 26' which when engaged with each other, provide a gas tight seal which at least substantially separates the gas in chambers on opposed sides of the O-ring 206.

Figure 13:
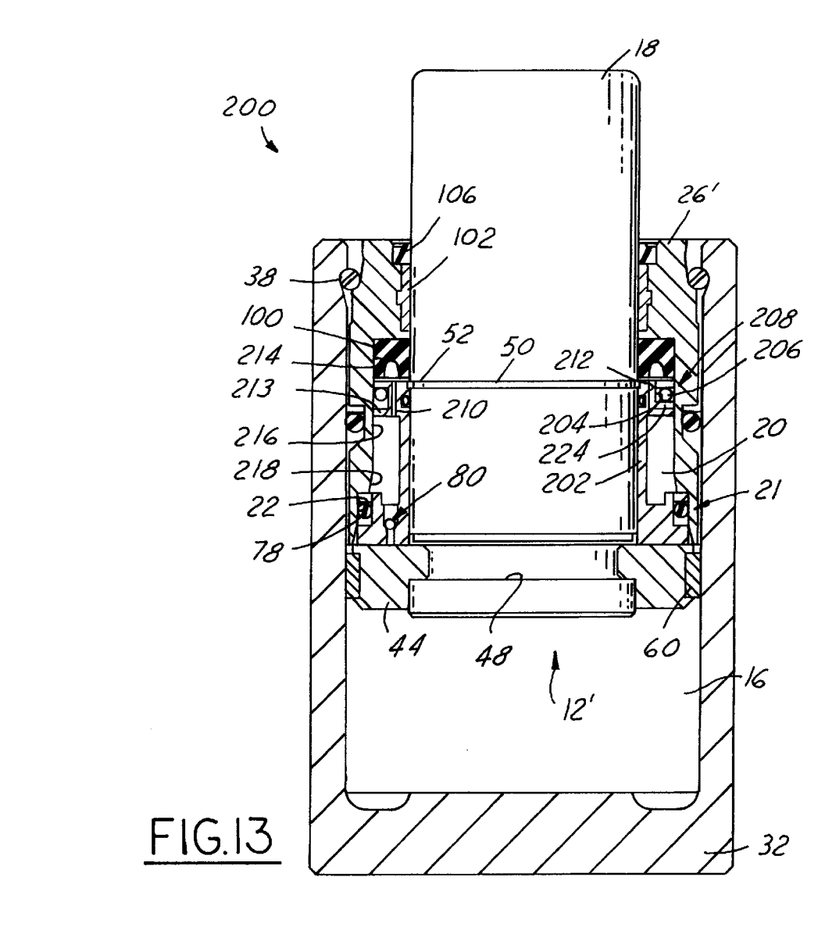
FIG. 13 is a cross sectional view of a gas spring according to a second embodiment of the present invention illustrating a piston rod assembly in its extended position.
Figure 15:
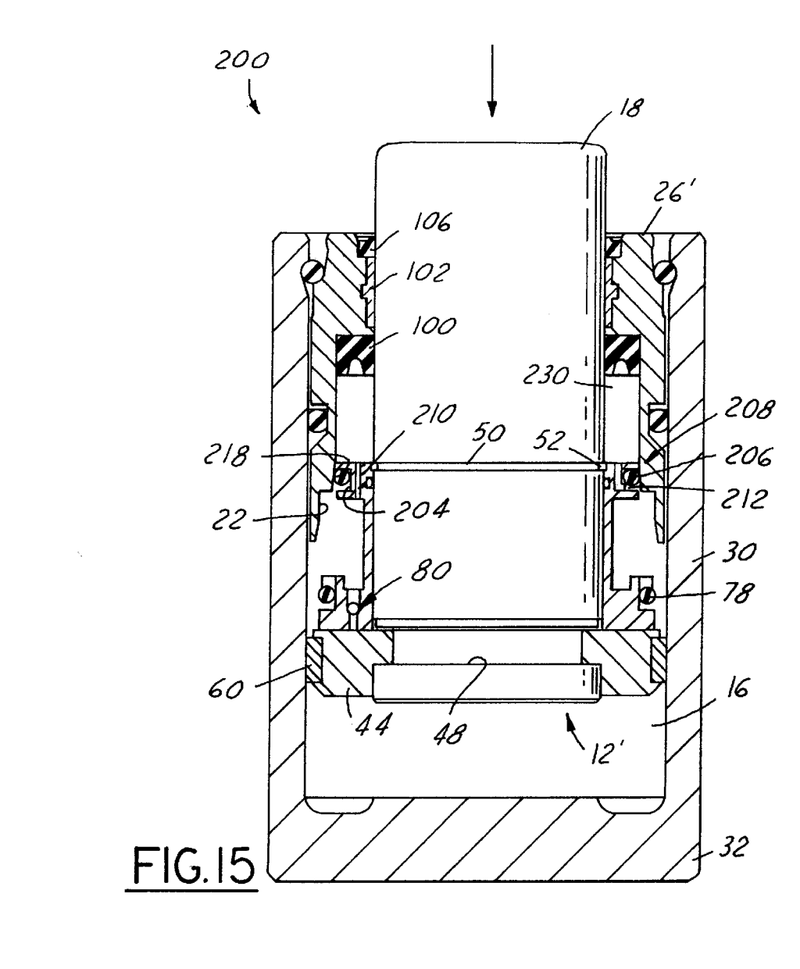
FIG. 15 is a cross sectional view of the gas spring illustrating the piston rod assembly moved further toward its retracted position.
Figure 16:
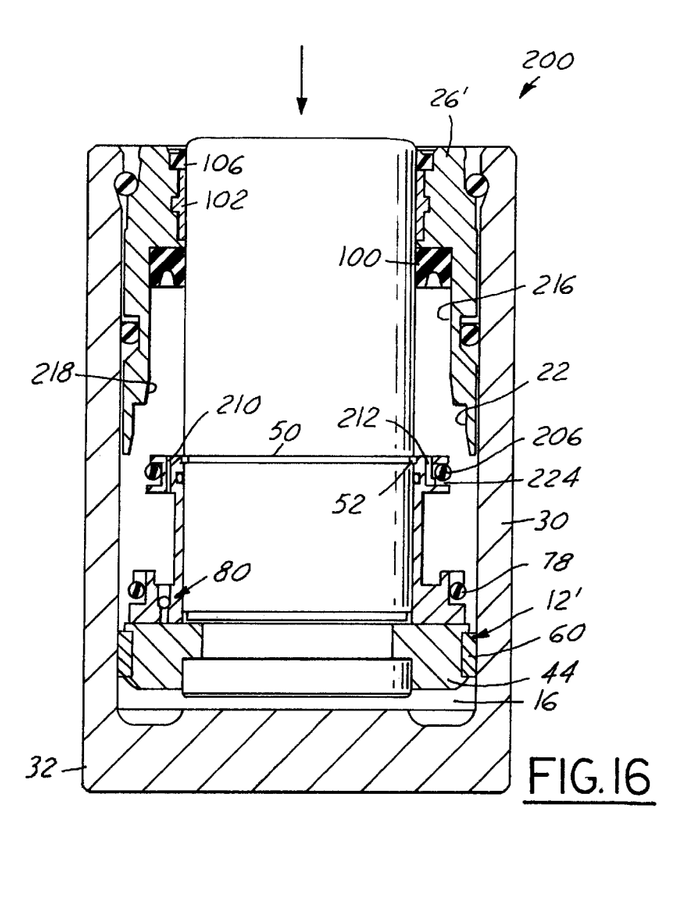
FIG. 16 is a cross sectional view of the gas spring illustrating the piston rod assembly in its fully retracted position.

As shown in FIG. 13, when the piston rod assembly 12' is at rest in its fully extended position, the first sealing assembly 21 separates the main and secondary gas chambers 16, 20 from each other. In this gas spring 200, a third gas chamber 230 is defined on the opposed side of the second sealing assembly 208 from the secondary gas chamber 20 and communicates with the secondary gas chamber 20 through the flow passages 212 and orifices 210. As shown in FIG. 14, as the piston rod assembly 12' is displaced towards its retracted position, the secondary gas chamber 20 remains separate from the main gas chamber 16 during at least a portion of this stroke of the piston rod assembly 12' and gas within the secondary gas chamber 20 flows relatively freely through the flow passages 212 into the third gas chamber 230 to maintain the second and third gas chambers 20, 230 at the same pressure. As shown in FIG. 15, as the piston rod assembly 12' moves further towards its retracted position, the O-ring 78 becomes separated from its sealing surface 22 so that the secondary gas chamber 20 is opened to the main gas chamber 16 to in effect, define a single gas chamber. Additionally, even though the O-ring 206 remains in contact with its corresponding sealing surface 216, the flow passages 212 remain open such that the third gas chamber 230 also communicates with both the first and second gas chambers. Finally, as shown in FIG. 16, when the piston rod assembly 12' reaches its fully retracted position the second O-ring 206 is separated from its corresponding sealing surface 216 so that essentially a single gas chamber exists throughout the gas spring 200 with all the gas therein being at the same pressure.

When the O-ring 78 of the first sealing assembly 21 separates from its corresponding sealing surface 22, so that all of the gas in the gas spring 200 is at essentially the same pressure, the gas spring 200 functions essentially as a conventional gas spring for the remainder of its movement toward its retracted position and during the initial portion of its return stroke until the O-ring 78 engages its corresponding sealing surface 22. Therefore, during the stroke of the piston rod assembly 12' from its extended position to its retracted position, the gas spring 200 functions essentially the same as the gas spring 10 to reduce the force initially required to displace the piston rod assembly 12' toward its retracted position as described with reference to the gas spring 10.

As shown in FIG. 17, when the O-ring 206 of the second sealing assembly 208 engages its corresponding flared or ramp portion 218 of its sealing surface 216, the O-ring 206 is displaced within its groove 204 to block the flow passages 212. The seal between the O-ring 206 and sealing surface 216 defines the third gas chamber 230 and separates gas therein from the remaining gas in the gas spring 200 with the exception that the orifices 210 remain open to provide a controlled bleed or flow of gas from the third gas chamber 230 to the second gas chamber 20. The flow of gas through the orifices 210 is restricted sufficiently so that continued movement of the piston rod assembly 12' towards its extended position, as shown in FIG. 19, compresses the gas in the third gas chamber 230 thereby increasing the pressure in the third gas chamber 230 and the corresponding force acting on the sleeve 202 of the piston rod assembly 12' to reduce the velocity at which the piston rod assembly 12' returns to its fully extended position. Notably, the volume of the secondary gas chamber 20 is fixed in this gas spring 200. The pressure in the secondary gas chamber 20 increases as the compressed gas in the third chamber 230, which is at a higher pressure as it is compressed during the return stroke, bleeds through the orifices 210 into the secondary gas chamber 20.

Desirably, the piston rod assembly 12' will return to its fully extended position slower than the rate at which the force of the press ram is withdrawn therefrom so that the binder ring, the workpiece on the binder ring and the piston rod assembly 12' separate from and return slower than the retracting press ram. Desirably, this reduces or eliminates the bounce of the binder ring and workpiece when the piston rod assembly 12' reaches its fully extended position. Further, this greatly reduces the impact of the shoulder of the sleeve 202 with the shoulder 72 of the retainer 26' to greatly reduce the noise of the gas spring 200 in use and to also extend the life of the sleeve 202, retainer 26' and the gas spring 200 in general by reducing the force of this impact.

When the piston rod assembly 12' has traveled sufficiently towards its extended position, the O-ring 78 of the first sealing assembly 21 will engage its corresponding sealing surface 22 to separate the second gas chamber 20 from the main gas chamber 16 in the same manner as described for the gas spring 10. After the piston rod assembly 12' returns to its fully extended position, the pressure of gas in the third gas chamber 230 may be the same as that in the second gas chamber 20 depending on the number and size of the orifices 210, before the beginning of the next cycle of the gas spring 200. In any event, upon initial movement of the piston rod assembly 12' towards its retracted position, the O-ring 206 will be displaced within its groove 204 in the sleeve 202 to open the flow passages 212 to permit a relatively free flow of gas between the second and third gas chambers 20, 230 to equalize the pressure of gas therein.

Figure 20:
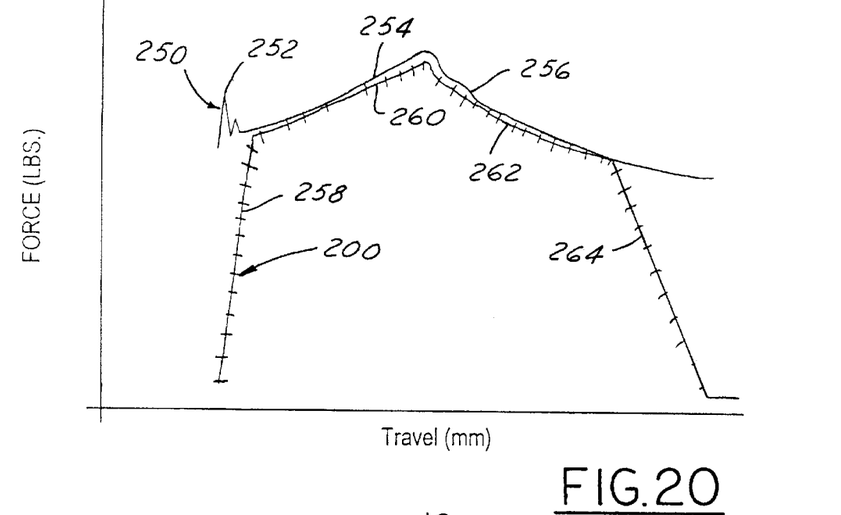
FIG. 20 is a graph of force as a function of travel of the piston rod assembly and comparing a prior art gas spring to a gas spring according to the present invention.

As shown in FIG. 20, in a conventional gas spring 250, a high force is required to initially displace the piston rod of the gas spring 250. Therefore, initial engagement of the press ram with the piston rod results in a high force impact or spike 252 as described with reference to the gas spring 10 of this invention. Further displacement of the piston rod toward its retracted position increases the force of gas on the piston rod as shown at line portion 254. Subsequent return movement of the piston rod towards its extended position reduces the force of gas on the rod., as shown at 256, until the movement of the piston rod is abruptly stopped by metal to metal engagement within the gas spring which is a relatively high impact, loud and noisy event. This abrupt stop also causes the binder ring and formed workpiece thereon to bounce which can damage and misalign the workpiece. The piston rod returns as fast as the press ram is retracted under the relatively high force of the gas acting on the piston rod. This high force within the gas spring and acting on the piston rod also causes the relatively high force impact of the metal to metal collision within the gas spring which stops movement of the gas spring and defines its extended position.

In comparison, the gas spring 200 requires a relatively low force to initially displace the piston rod assembly 12' due to the reduced pressure differential across the piston rod assembly, as described in greatest detail with regard to the gas spring 10. Initial travel of the piston rod assembly gradually ramps the force required to displace the piston rod assembly as shown by line 258, to prevent any spike or rapid increase in force as in a conventional gas spring. After the seal created by the first seal assembly 21 is terminated, the gas spring functions substantially the same as the conventional gas spring with an increasing force over the continued piston rod travel to its fully retracted position, as indicated by line 260, and a decreasing force over the initial return stroke, shown at 262, until the seal of the second seal assembly 208 is created to thereby essentially trap gas within the third gas chamber 230 and to increase its pressure upon further movement of the piston rod assembly 12' towards its extended position, as shown at line 264. The increasing pressure within the third chamber 230, which is also bled into the second chamber 20, produces a reduced net force across the piston rod assembly 12'. The reduced force across the piston rod assembly 12' decreases the velocity of travel of the piston rod assembly 12' towards its extended position as a function of the pressure differential across the piston rod assembly 12'.

Therefore, according to this second embodiment of the invention, the gas spring 200 provides a decreased velocity of the return stroke of the piston rod assembly 12' during at least a latter portion of the return stroke and also requires a reduced force to initially displace the piston rod assembly 12'. This greatly reduces the noise of the press and gas spring 200 in use, extends the life of the press and gas spring, and avoids damage to the workpiece and handling problems due to misalignment and bouncing of the workpiece after completion of the return stroke of the gas spring.

To facilitate a relatively rapid cycling of the gas spring 200, the O-ring is preferably formed of a material resistant to degradation by relatively high heat up to and potentially exceeding 130° C. The seal material is preferably formed from a polyurethane material having high abrasion resistance and a hardness of at least 90 on the Shore A scale. These characteristics will extend the life of the seal and permit a rapid cycle rate, but other materials with other properties can be used. Also, the O-ring 206 can be constructed to check or prevent flow in only one direction without being displaced in its groove 204 by incorporating a flap or other design characteristic which closes the inlets 224 when acted on by a net gas pressure in one direction and which is displaced from the inlets 224 to permit gas flow therethrough when acted on by a net gas pressure in the other direction.

A presently preferred alternate embodiment is shown in FIG. 19, to control and limit localized heating in the gas spring 200 adjacent to and of O-ring 206, interconnecting transfer passages 280, 282 and 284 are formed in the piston rod 18. The passages permit a free flow of gas between the second and third gas chambers 20, 230 in the same manner as the orifices 210, and may be provided in addition to or, more preferably, in place of the orifices 210 as shown in FIG. 19. Passage 280 opens at one end between seal 100 and seal assembly 208 to communicate with the third gas chamber 230 and opens at its other end to passage 282. Desirably, a restriction 286 is provided between these passages 280, 282 to control and limit gas flow therethrough. For ease of manufacture, passage 282 extends generally transversely to passage 280 and communicates passage 280 with passage 284 which also preferably extends transversely to passage 282. Passage 282 may be formed by drilling (or any other method) through the end of piston rod 18 and a plug 288 closes the end of passage 282 to prevent the flow of gas directly between passage 282 and the main gas chamber 16. Passage 284 may extend completely through the piston rod 18 and communicates between the first and second sealing assemblies 21 and 208, via holes 290 through the sleeve 202, to communicate with the second gas chamber 20.

Accordingly, the passages 280, 282, 284 permit a gas flow across the second seal assembly 208 which is controlled by the restriction 286. Thus, the passages 280, 282, 284 function in the same general manner as the orifices 210 and are preferably used instead of the orifices 210. Desirably, the passages route the controlled gas flow away from the areas of the sleeve 202 containing O-ring 206 to limit heat build-up near the O-ring 206. This reduced or limited temperature at O-ring 206 permits a faster cycle time for the gas spring 200 without negative effect on its 20 seals.

Further, as shown in FIG. 19, one or more heat pipes 292, may be disposed in complementary blind bores 294 in the piston rod 18 to improve heat transfer to the top of the piston rod and thereafter, out of the gas spring 200. Desirably, this provides further cooling or limitation of heat build-up to permit still faster cycling of the gas spring 200. The heat pipes 292 are elongate, generally tubular rods formed of a material having high thermal conductivity, closed at both ends, containing a quantity of a working liquid at a controlled pressure and a central wick. When the liquid at one end of the heat pipe 292 reaches a certain temperature, it evaporates and rises in the heat pipe. The heat pipe 292 is designed and positioned such that a sufficient temperature difference exists between its ends to permit the evaporated working fluid to recondense at the other end to thereby dissipate heat in this phase transformation. The condensed working fluid returns through the wick to begin another cycle. A suitable heat pipe 292 is commercially available from Thermacore, Inc. of Lancaster, Pa.

Third Embodiment

Figure 21:
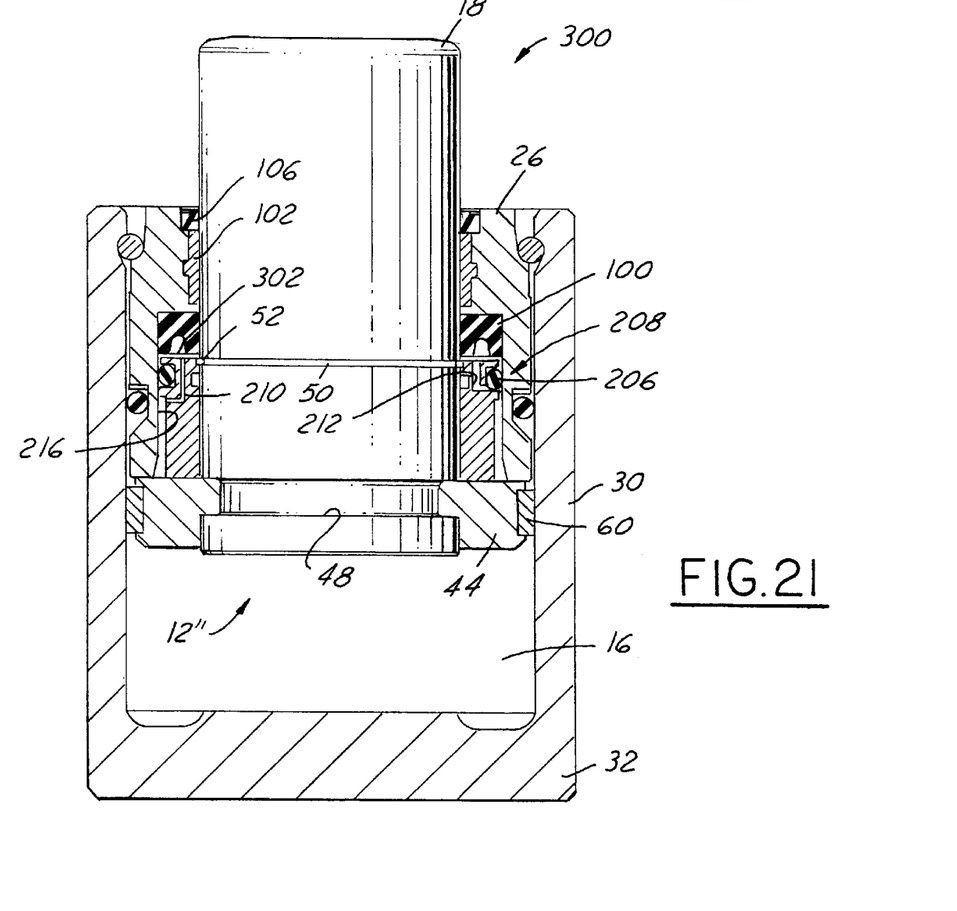
FIG. 21 is a cross sectional view of a gas spring according to a third embodiment of the invention.

As shown in FIG. 21, a third embodiment of a gas spring 300 may have only the second sealing assembly 208 provided to reduce the velocity of the piston rod assembly 12" when it moves adjacent to and towards its fully extended position without any sealing assembly 21 to provide the reduced net force across the piston rod assembly 12" at its fully extended position as described in greatest detail with regard to the gas spring 10. Desirably, as described with reference to the gas spring 200, the O-ring 206 is displaced upon engagement with its sealing surface 216 to block off the flow passages 212 and define a gas chamber 302 separate from the remaining gas in the gas spring 300 to control the rate of return of the piston rod assembly 12" to its extended position. Orifices 210 bleed the high pressure gas into the main gas chamber 16 at a controlled rate. In any event, on the down stroke or the movement of the piston rod assembly from its extended position towards its retracted position, the O-ring 206 is displaced to open the flow passages 212 so that all of the gas in the gas spring 300 is at essentially the same pressure.

Therefore, the gas spring 300 may be constructed to provide a reduced force required to initially displace the piston rod assembly 12 from its fully extended position, or it may be constructed to provide only a reduced rate of return of the piston rod assembly 12" over at least a portion of its return stroke, or it may be constructed to provide both of these features and the significant advantages associated therewith. Further, the gas springs are of a standard size and can be used in many applications including mechanical cam slide return systems or anywhere that gas springs, in general, may be used. Desirably, the gas springs may be self-contained or they may be used with a manifold system to control the gas supplied to each gas spring.

What is claimed is:

1. A gas spring comprising:
   a casing defining in part a main gas chamber adapted to receive a gas under pressure;
   a piston rod assembly received at least in part in the casing for reciprocation between extended and retracted positions;
   a first sealing surface within the gas spring;
   a second sealing surface constructed to provide a substantially gas-tight seal with the first sealing surface during a portion of the stroke of the piston rod assembly to define in part a secondary gas chamber separate from the main gas chamber and adapted to contain a gas under pressure providing a force on the piston rod assembly opposed to the force on the piston rod assembly of the gas in the main gas chamber to reduce the net force on the piston rod assembly during said portion of the piston rod assembly stroke and configured so that when the piston rod assembly is in its extended position, the gas pressure in the secondary gas chamber is greater than gas pressure in the main gas chamber.

2. The gas spring of claim 1 which also comprises a retainer carried by the casing and the first sealing surface is defined in the retainer.

3. The gas spring of claim 1 which also comprises a sleeve carried by the piston rod assembly and defining the second sealing surface.

4. The gas spring of claim 3 which also comprises a sealing member carried by the sleeve and defining the second sealing surface.

5. The gas spring of claim 4 wherein the sealing member is annular and slidably engages the first sealing surface to define the separate chambers throughout said portion of the piston rod assembly stroke.

6. The gas spring of claim 1 wherein the second sealing surface is carried by the piston rod assembly.

7. The gas spring of claim 1 wherein the piston rod assembly comprises a piston and a piston rod, and the piston, piston rod and second sealing surface are integrally formed.

8. A gas spring comprising:
   a casing defining in part a main gas chamber adapted to receive a gas under pressure;
   a piston rod assembly received at least in part in the casing for reciprocation between extended and retracted positions;
   a first sealing surface within the gas spring;
   a second sealing surface constructed to provide a substantially gas-tight seal with the first sealing surface during a portion of the stroke of the piston rod assembly to define in part a secondary gas chamber separate from the main gas chamber and adapted to contain a gas under pressure providing a force on the piston rod assembly generally opposed to the force on the piston rod assembly of the gas in the main gas chamber to reduce the net force on the piston rod assembly during said portion of the piston rod assembly stroke and a check valve carried by the piston rod assembly and constructed to permit gas flow therethrough in one direction to permit gas in the main gas chamber to flow into the secondary gas chamber under at least some gas pressure conditions in the separate chambers.

9. The gas spring of claim 3 which also comprises a retaining ring carried by the piston rod assembly and engageable by the sleeve to retain the sleeve on the piston rod assembly.

10. The gas spring of claim 4 wherein the sleeve has a circumferential groove in which the sealing member is received.

11. The gas spring of claim 1 wherein the first and second sealing surfaces cooperate to initially define the gas-tight seal at a point in the stroke of the piston rod assembly between its extended and retracted positions and wherein the gas-tight seal is maintained between the fully extended position of the piston rod assembly and said point.

12. The gas spring of claim 1 wherein each of the first and second sealing surfaces are circumferentially continuous.

13. The gas spring of claim 1 which also comprises at least one heat pipe carried by the piston rod assembly.

14. The gas spring of claim 1 wherein the net force on the piston rod assembly tending to move it toward its retracted position is less than the net force on the piston rod assembly tending to move it toward its extended position.

15. The gas spring of claim 1 which also comprises a retainer carried by the casing and the first sealing surface is carried by one of the casing and the retainer.

16. A gas spring, comprising:
   a casing;
   a piston rod assembly at least partially received in the casing for reciprocation between extended and retracted positions;
   a main gas chamber defined at least in part by the casing and piston rod assembly;
   a secondary gas chamber communicating with the main gas chamber when the piston rod assembly is fully retracted; and
   a seal closing the secondary gas chamber when the piston rod assembly is fully extended to compress gas therein to a higher pressure than the gas in the main gas chamber to reduce the net force on the piston rod assembly relative to the net force on the piston rod assembly when the secondary gas chamber communicates with the main gas chamber.

17. A gas spring, comprising:
a casing;
a piston rod assembly at least partially received in the casing for reciprocation between extended and retracted positions;
a main gas chamber defined at least in part by the casing and piston rod assembly and adapted to contain a gas under pressure;
a secondary gas chamber communicating with the main gas chamber when the piston rod assembly is fully retracted;
a seal separating the secondary gas chamber from the main gas chamber when the piston rod assembly is adjacent to and in its fully extended position to separate the gas in each chamber;
at least one passage communicating at one end with the secondary gas chamber and at its other end with the main gas chamber; and
a valve communicating with the passage and movable between an open position permitting an essentially free flow of gas through said at least one passage so that gas in the secondary and main gas chambers is at the same pressure and a closed position at least substantially restricting gas flow through said at least one passage to permit, when the seal is provided, gas in the secondary chamber to be compressed to a higher pressure in response to movement of the piston rod assembly to its extended position to decrease the differential force across the piston rod assembly.

18. The gas spring of claim 17 wherein an annular sealing member carried by the piston rod assembly defines both the seal and the valve.

19. The gas spring of claim 17 which also comprises at least one orifice communicating the secondary gas chamber with the main gas chamber to permit a controlled flow of gas between the secondary and main gas chambers.

20. The gas spring of claim 18 wherein the annular sealing member is slidably carried by the piston rod assembly relative to said at least one passage to selectively permit gas flow through said at least one passage.

21. The gas spring of claim 18 wherein the annular sealing member is constructed with a flexible portion which is responsive to gas flow in only one direction to permit gas flow through said at least one passage in said one direction and is responsive to gas flow in a second direction generally opposed to said one direction to prevent gas flow through said at least one passage in the second direction.

22. The gas spring of claim 17 wherein the valve is constructed to close during at least a portion of the movement of the piston rod assembly from its retracted position to its extended position so that when the seal is provided, gas in the secondary gas chamber is compressed in response to further movement of the piston rod assembly to its extended position to decrease the differential force across the piston rod assembly and thereby decrease the speed at which it moves to its fully extended position.

23. The gas spring of claim 17 which also comprises at least one transfer passage communicating the secondary gas chamber with the main gas chamber to permit a controlled flow of gas between the secondary and main gas chambers.

24. The gas spring of claim 23 which also comprises a restriction in said at least one transfer passage to control the flow of gas through said at least one transfer passage.

25. The gas spring of claim 17 which also comprises a heat pipe carried by the piston rod assembly.

26. A gas spring, comprising:
a casing;
a piston rod assembly at least partially received in the casing for reciprocation between extended and retracted positions;
a main gas chamber defined at least in part by the casing and piston rod assembly;
a secondary gas chamber communicating with the main gas chamber when the piston rod assembly is fully retracted;
a third gas chamber communicating with the main gas chamber and secondary gas chamber when the piston rod assembly is fully retracted;
a first seal separating the secondary gas chamber form the main gas chamber when the piston rod assembly is fully extended to separate the gas in each chamber;
a second seal spaced from the first seal and disposed between the third gas chamber and the secondary gas chamber when the piston rod assembly is adjacent to and in its fully extended position to permit gas in the third gas chamber to be compressed during at least a portion of the piston rod assembly movement when the second seal is provided to reduce the net force on the piston rod assembly relative to the net force on the piston rod assembly when the third gas chamber and secondary gas chamber communicate with the main gas chamber;
a passage communicating at one end with the secondary gas chamber and at its other end with the third gas chamber; and
a valve communicating with the passage and movable between an open position permitting an essentially free flow of gas through the passage so that gas in the secondary and third gas chambers is at the same pressure and a closed position at least substantially restricting gas flow through the passage to permit, when the second seal is provided, a pressure differential to be generated between the secondary and: third gas chambers.

27. The gas spring of claim 26 which also comprises at least one orifice communicating the secondary gas chamber with the third gas chamber and wherein during the movement of the piston rod assembly toward its extended position, the second seal is initially provided to separate the third gas chamber and permit gas therein to be compressed up on further movement of the piston rod assembly after the second seal is provided, and upon further movement of the piston rod assembly after the second seal is provided, the first seal is provided to separate the secondary gas chamber from the main gas chamber to maintain gas which flows through said at least one orifice within the secondary gas chamber to provide an increased pressure of gas within the secondary gas chamber relative to the main gas chamber.

28. The gas spring of claim 26 which also comprises at least one transfer passage communicating the secondary gas chamber with the third gas chamber and wherein during the movement of the piston rod assembly toward its extended position, the second seal is initially provided to separate the third gas chamber and permit gas therein to be compressed upon further movement of the piston rod assembly after the second seal is provided, and upon further movement of the piston rod assembly after the second seal is provided, the first seal is provided to separate the secondary gas chamber from the main gas chamber to maintain gas which flows through said at least one transfer passage within the secondary gas chamber to provide an increased pressure of gas within the secondary gas chamber relative to the main gas chamber.

29. The gas spring of claim 28 which also comprises a restriction in said at least one transfer passage to control gas flow therethrough.

30. The gas spring of claim 28 wherein the piston rod assembly has a piston rod and said at least one transfer passage is formed at least in part in the piston rod and communicates at one end on one side of the second seal and at its other end on the other side of the second seal.

31. The gas spring of claim 30 wherein said other end of said at least one transfer passage is disposed between the first seal and second seal.

32. The gas spring of claim 26 which also comprises at least one heat pipe carried by the piston rod assembly.

* * * * *

UNITED STATES PATENT AND TRADEMARK OFFICE
CERTIFICATE OF CORRECTION

PATENT NO. : 6,491,143 B1
DATED : December 10, 2002
INVENTOR(S) : Sven Stenquist It is certified that error appears in the above-identified patent and that said Letters Patent is hereby corrected as shown below:

Column 16,
Line 16, delete "form" and insert -- from --.
Line 40, after "and" delete ":".
Line 48, delete "up on" and insert -- upon --.

Signed and Sealed this

Eleventh Day of March, 2003

JAMES E. ROGAN
*Director of the United States Patent and Trademark Office*